(12) United States Patent
Hannon

(10) Patent No.: US 9,692,880 B2
(45) Date of Patent: Jun. 27, 2017

(54) APPARATUS, SYSTEM, AND METHOD FOR INHIBITING OPERATION OF MOBILE DEVICES WITHIN A ZONE

(71) Applicant: Driving Management Systems, Inc., San Francisco, CA (US)

(72) Inventor: Marwan Hannon, San Francisco, CA (US)

(73) Assignee: DRIVING MANAGEMENT SYSTEMS, INC., San Francisco, CA (US)

( * ) Notice: Subject to any disclaimer, the term of this patent is extended or adjusted under 35 U.S.C. 154(b) by 0 days.

(21) Appl. No.: 15/087,194

(22) Filed: Mar. 31, 2016

(65) Prior Publication Data

US 2016/0295006 A1 Oct. 6, 2016

Related U.S. Application Data

(60) Provisional application No. 62/142,058, filed on Apr. 2, 2015.

(51) Int. Cl.
*H04W 24/00* (2009.01)
*H04M 1/725* (2006.01)
*H04W 4/02* (2009.01)

(52) U.S. Cl.
CPC ... *H04M 1/72577* (2013.01); *H04M 1/72572* (2013.01); *H04W 4/021* (2013.01); *H04M 1/72552* (2013.01); *H04M 2250/10* (2013.01)

(58) Field of Classification Search
CPC ......... H04M 1/72577; H04M 1/72572; H04M 1/72552; H04W 4/021

USPC ........... 455/404.2, 412.1–412.2, 418–422.1, 455/552.1, 41.1–41.2, 456.1–457
See application file for complete search history.

(56) References Cited

U.S. PATENT DOCUMENTS

| 6,556,810 B2* | 4/2003 | Suzuki | H04K 3/415 455/345 |
| 2002/0086635 A1* | 7/2002 | Tomono | H04M 1/72577 455/1 |
| 2002/0107032 A1* | 8/2002 | Agness | H04B 1/3805 455/456.6 |
| 2003/0003901 A1* | 1/2003 | Kuroiwa | H04M 1/663 455/419 |

(Continued)

FOREIGN PATENT DOCUMENTS

WO WO 2012/175352 A1 12/2012

OTHER PUBLICATIONS

International Search Report and Written Opinion for International Application No. PCT/US2016/025246, dated Aug. 30, 2016 (12 pages).

*Primary Examiner* — Babar Sarwar
(74) *Attorney, Agent, or Firm* — K&L Gates LLP

(57) ABSTRACT

Methods, systems, and apparatus for inhibiting a function of a mobile device in a predetermined detection zone are disclosed. A method includes receiving, by a mobile device, a first communication signal when the mobile device is located within a predetermined field of transmission, determining that the first communication signal was transmitted by a first beacon of a plurality of beacons, and inhibiting at least one function of the mobile device upon determining that the first communication signal was transmitted by the first beacon.

11 Claims, 8 Drawing Sheets

(56) References Cited

U.S. PATENT DOCUMENTS

| | | | |
|---|---|---|---|
| 2003/0134626 A1* | 7/2003 | Himmel | H04M 1/642 |
| | | | 455/419 |
| 2004/0198306 A1* | 10/2004 | Singh | H04M 1/66 |
| | | | 455/345 |
| 2009/0015654 A1 | 1/2009 | Hayashi | |
| 2009/0197584 A1* | 8/2009 | Snow | H04M 1/72577 |
| | | | 455/418 |
| 2009/0312038 A1* | 12/2009 | Gildea | G01S 19/52 |
| | | | 455/456.4 |
| 2010/0112945 A1* | 5/2010 | Hanif | H04L 12/2816 |
| | | | 455/41.2 |
| 2011/0045815 A1* | 2/2011 | Schork | H04W 48/04 |
| | | | 455/418 |
| 2011/0063098 A1* | 3/2011 | Fischer | G07C 9/00119 |
| | | | 340/439 |
| 2011/0183601 A1* | 7/2011 | Hannon | B60K 35/00 |
| | | | 455/1 |
| 2014/0087758 A1 | 3/2014 | Maor | |
| 2014/0113560 A1 | 4/2014 | Graube et al. | |
| 2014/0162588 A1* | 6/2014 | Kemper | H04W 4/027 |
| | | | 455/404.2 |
| 2014/0274020 A1* | 9/2014 | Miller | H04W 4/046 |
| | | | 455/418 |

\* cited by examiner

APPARATUS, SYSTEM, AND METHOD FOR INHIBITING OPERATION OF MOBILE DEVICES WITHIN A ZONE

STATEMENT OF PRIORITY

This application claims the benefit of U.S. Provisional Patent Application Ser. No. 62/142,058, entitled "APPARATUS, SYSTEM, AND METHOD FOR INHIBITING OPERATION OF MOBILE DEVICES WITHIN A ZONE," filed on Apr. 2, 2015, the disclosure of which is incorporated herein by reference in is entirety and for all purposes.

BACKGROUND

Mobile devices such as wireless devices, including, for example, cellular telephones, smart phones, laptop computers, notebook computers, tablet devices (e.g., iPad by Apple®) are ubiquitous in modern society. Use of such mobile devices while a person is in motion, however, can be hazardous. The problem is exacerbated in areas where pedestrians that using such devices interact with automobiles, bicycles, or other pedestrians, such as at or in a crosswalk. Rates of accidents or injuries where pedestrians are distracted by the use of mobile devices are rising. More specifically, text messaging while pedestrians are in motion can be dangerous and has been linked with causing injuries.

The widespread adoption of mobile devices and common use of the devices has raised concerns about the distraction of the users of such devices, particularly when walking in areas that involve interactions with vehicles. A user speaking or text messaging on a mobile telephone may become mentally distracted from where that user is walking and lose awareness of the possible dangers in the area that he or she is walking. It is not uncommon to see an individual involved in an accident who was speaking or text messaging on a mobile device rather than paying attention to the surroundings. Emerging data even suggests that individuals speaking on mobile telephones while walking may be at higher risk for an accident that those driving a car and using a mobile device.

Thus, it would be highly desirable to detect the presence of a mobile device such as a wireless device within a particular zone, such as a crosswalk, and control or disable the operation of the mobile device.

SUMMARY

In one aspect, a method for inhibiting a function of a mobile device in a predetermined detection zone is disclosed herein that comprises receiving, by a mobile device, a first communication signal when the mobile device is located within a predetermined field of transmission, determining that the first communication signal was transmitted by a first beacon of a plurality of beacons, and inhibiting at least one function of the mobile device upon determining that the first communication signal was transmitted by the first beacon.

In another aspect, a system for inhibiting a function of a mobile device in a predetermined detection zone is disclosed herein that comprises a plurality of beacons comprising a first beacon and a second beacon. Further, the first beacon is configured to transmit a first communication signal within a first predetermined field of transmission to a mobile device when the mobile device is located within the first predetermined field of transmission of the first beacon and to cause the mobile device to inhibit at least one function of the mobile device upon reception of the first communication signal transmitted by the first beacon. Additionally, the second beacon is configured to transmit a second communication signal within a second predetermined field of transmission to the mobile device when the mobile device is located within the second predetermined field of transmission of the second beacon and to cause the mobile device to inhibit at least one function of the mobile device upon reception of the second communication signal transmitted by the second beacon.

In yet another aspect, a communications apparatus for inhibiting a function of a mobile device in a predetermined detection zone is disclosed herein that comprises a mobile device and a control module associated with the mobile device. Further, the control module is configured to receive a first communication signal transmitted by a first beacon of a plurality of beacons when the mobile device is located within a first predetermined field of transmission of the first beacon and the control module is configured to inhibit at least one function of the mobile device upon receiving the first communication signal transmitted by the first beacon.

In still another aspect, a method for inhibiting a function of a mobile device in a predetermined detection zone is disclosed herein that comprises receiving, by a mobile device, a first communication signal as the mobile device is located within a first predetermined field of transmission, receiving, by the mobile device, a second communication signal as the mobile device is located within a second predetermined field of transmission, receiving, by the mobile device, a third communication signal as the mobile device is located within a third predetermined field of transmission, and inhibiting the at least one function of the mobile device upon determining that the mobile device is in the location defined by the intersection of the first predetermined field of transmission, the second predetermined field of transmission, and the third predetermined field of transmission.

FIGURES

FIGS. 5a-6b illustrate interfaces that are presented by a mobile application for determining the presence of a mobile device located in a predetermined detection zone according to the present disclosure.

DESCRIPTION

The present disclosure describes embodiments of an apparatus, system, and method for determining the presence of a mobile device located in a predetermined detection zone. In one embodiment, the present disclosure is directed to embodiments of an apparatus, system, and method for determining the presence of a mobile device located in a predetermined detection zone and disabling some or all of the functions of the mobile device when it is detected in the predetermined detection zone. More particularly, the present disclosure is directed to automatically preventing a person in a walkway, such as a crosswalk, from text messaging and doing other similar excessively dangerous activities with the mobile device while located in the walkway.

It is to be understood that this disclosure is not limited to particular aspects or embodiments described, as such may vary. It is also to be understood that the terminology used herein is for the purpose of describing particular aspects or embodiments only, and is not intended to be limiting, since the scope of the apparatus, system, and method for detecting the presence of a mobile device within a vehicle and controlling the operation of the mobile device when it is detected is defined only by the appended claims.

Figure 1:
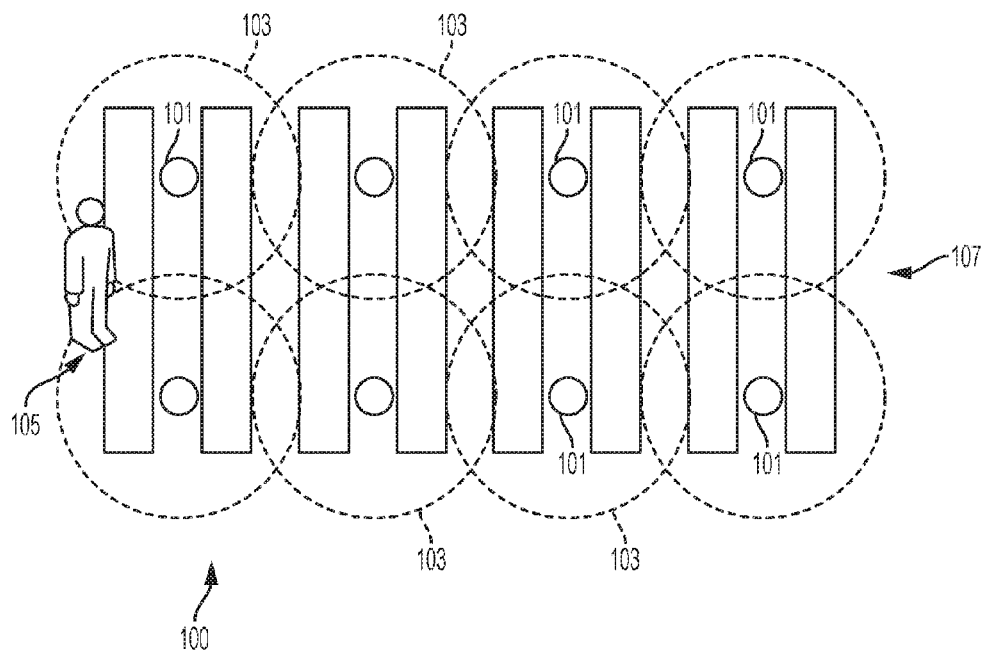
FIG. 1 illustrates an embodiment of a system for determining the presence of a mobile device located in a predetermined detection zone according to the present disclosure.

As shown with regard to FIG. 1, a system 100 for determining the presence of a mobile device located in a predetermined detection zone is disclosed. The system 100 comprises a plurality of beacons 101 that each have a predetermined field of transmission 103. The beacons 101 may be embedded or otherwise permanently attached to a walkway 107, such as a crosswalk in a road or street. The beacons 101 may be configured to transmit a signal that is received by a mobile device carried by a user 105. Upon receiving the signal, the mobile device is configured to determine that the signal was transmitted by a beacon 101 of a plurality of beacons 101 and to inhibit at least one function of the mobile device upon determining that signal was transmitted by the beacon 101.

Depending on the location of the mobile device of the user 105, the mobile device may receive a signal from more than one beacon 101. Similarly, the mobile device may be configured to determine that a second signal was transmitted by another beacon 101 of the plurality of beacons 101 and to inhibit the at least one function of the mobile device upon determining that the second signal was transmitted by the second beacon 101. In addition, the mobile device may be configured to receive additional signals from additional beacons 101 and inhibit a function accordingly. Additionally, the mobile device may be configured to receive first signals from different beacons 101 as it moves through a predetermined field of transmission 103 to another predetermined field of transmission 103 and the mobile device may be configured to inhibit a function accordingly.

The placement of the beacons 101 may define a predetermined detection zone, such as the walkway 107. Accordingly, the predetermined field of transmission 103 of each of the plurality of beacons 101 may be configured such that the entirety of the walkway 107 is covered by at least one predetermined field of transmission 103 of at least one beacon 101. Accordingly, as the user 105 move across the walkway 107 and is within the boundaries of the walkway 107, which may be defined by the predetermined fields of transmission 103 of the beacons 101, at least one function of a mobile device being carried by the user 105 will be interrupted. In one embodiment, the mobile device may continuously receive the signal from a beacon 101 when the mobile device is located within the predetermined detection zone, and the at least one function of the mobile device may no longer be inhibited after the mobile device no longer receives the signal from a beacon 101. In one embodiment, the at least one function of the mobile device may no longer be inhibited following a predetermined time period.

Figure 2:
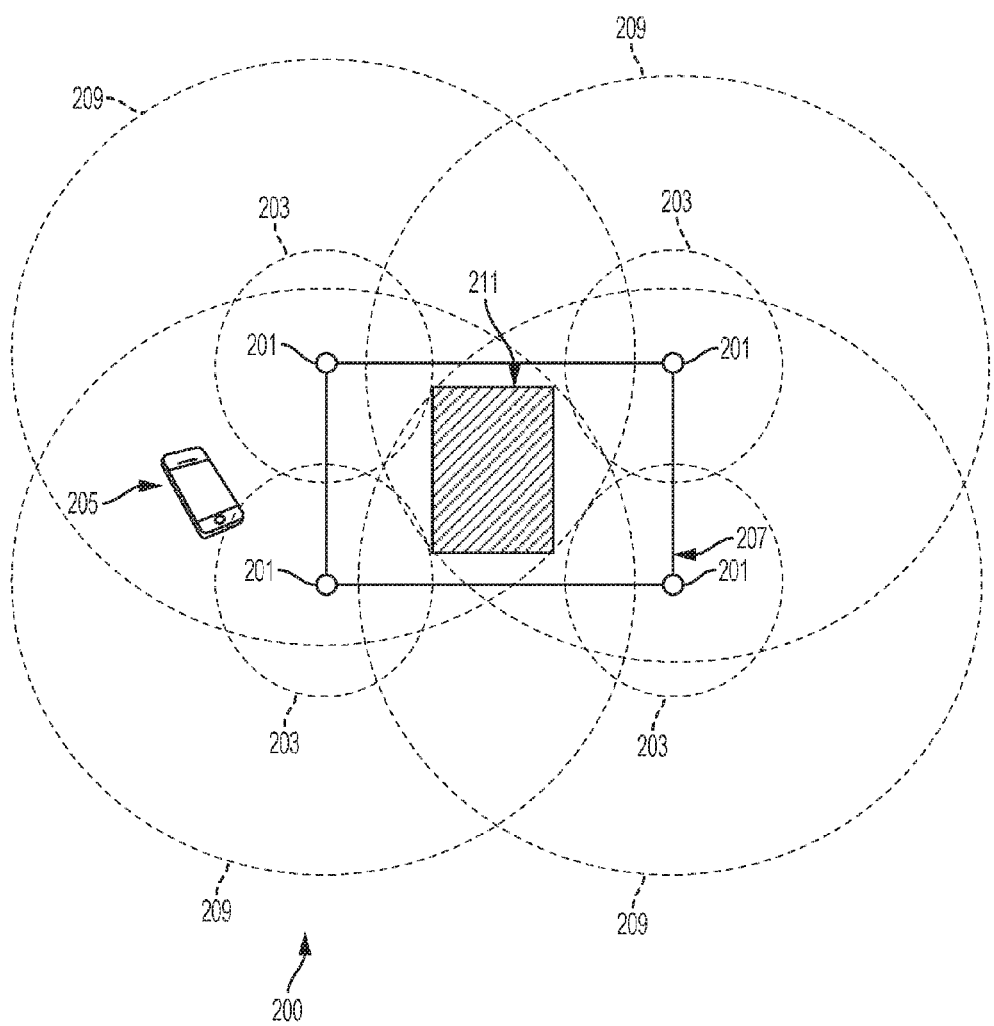
FIG. 2 illustrates another embodiment of a system for determining the presence of a mobile device located in a predetermined detection zone according to the present disclosure.

In another embodiment shown in FIG. 2, a system 200 for determining the presence of a mobile device 205 located in a predetermined detection zone is disclosed. The system 200 comprises a plurality of beacons 201 that each have a first predetermined field of transmission 203 and a second predetermined field of transmission 209. The beacons 201 may be embedded in a walkway 207, such as a crosswalk in a road or street. The beacons 201 may be configured to transmit a first signal that is received by a mobile device 205 carried by a user when the mobile device 205 is within a first predetermined field of transmission 203 of the beacons 201. Upon receiving the signal, the mobile device 205 may be configured to determine that the signal was transmitted by a beacon 201 of a plurality of beacons 201 and to inhibit at least one function of the mobile device 205 upon determining that signal was transmitted by the beacon 201. In one embodiment, the first signal transmitted by a beacon 201 may the same or similar to a signal transmitted by a beacon 101.

Depending on the location of the mobile device 205 of the user, the mobile device 205 may receive the first signal from more than one beacon 201 if the first predetermined field of transmission 203 overlaps another first predetermined field of transmission 203. Additionally, the mobile device 205 may be configured to receive first signals from different beacons 201 as it moves through a first predetermined field of transmission 203 to another first predetermined field of transmission 203 and the mobile device 205 may be configured to inhibit a function accordingly.

In addition, the beacons 201 may be configured to transmit a second signal that is received by a mobile device 205 when the mobile device 205 is within a second predetermined field of transmission 209 of a beacon 201. Accordingly, the mobile device 205 may be configured, such that when it receives the second signal from a plurality of beacons 201, to determine that the second signal was transmitted by the plurality of beacons 201 and to inhibit at least one function of the mobile device 205 upon determining that signal was transmitted by the plurality of beacons 201.

In the embodiment shown in FIG. 2, the mobile device 205 is configured to receive the second signal from at least three beacons 201 and upon determining that the mobile device 205 is located in the zone 211, the mobile device 205 may be configured to inhibit at least one function of the mobile device 205. The zone 211 may be sized and configured such that the zone 211 is defined where at least three of the second predetermined fields of transmission 209 intersect. In one embodiment, the mobile device 205 may be configured to determine that its location is within the zone 211 based on triangulation.

Figure 3:
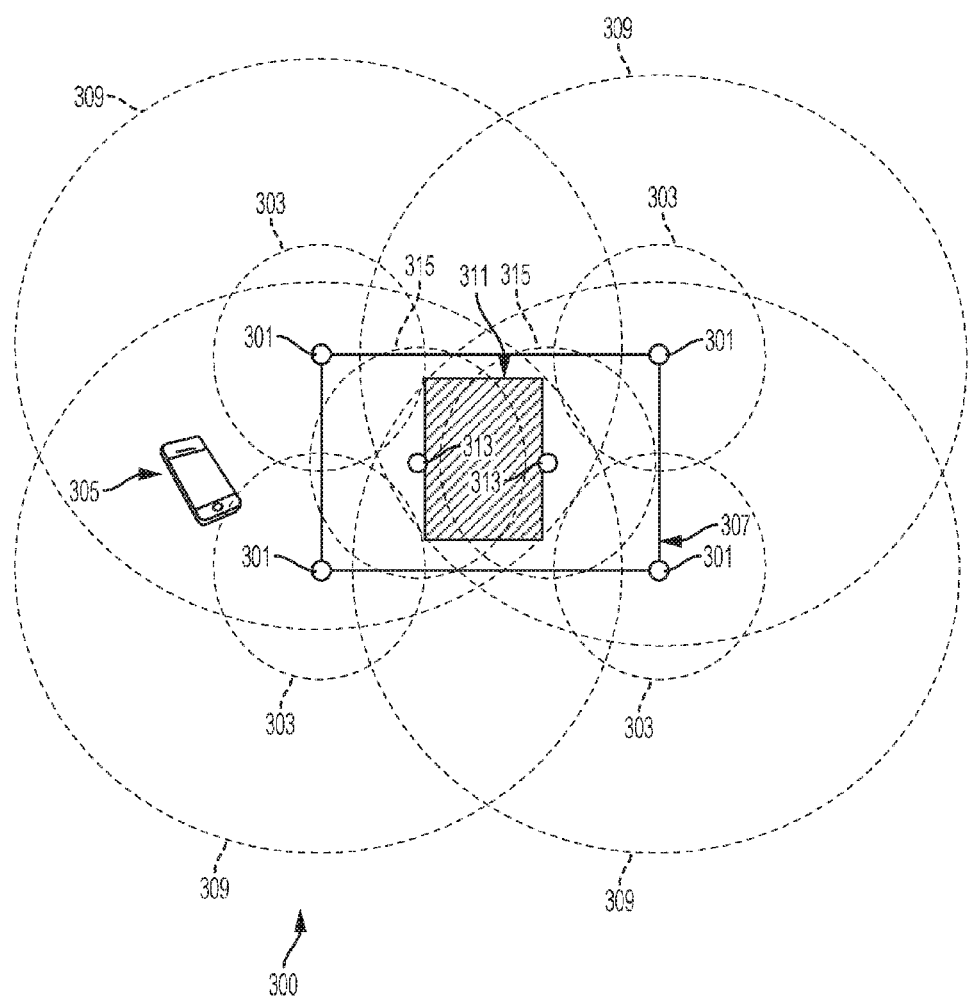
FIG. 3 illustrates another embodiment of a system for determining the presence of a mobile device located in a predetermined detection zone according to the present disclosure.

In another embodiment shown in FIG. 3, a system 300 for determining the presence of a mobile device 305 located in a predetermined detection zone is disclosed. The system 300 comprises a first plurality of beacons 301 and a second plurality of beacons 313. Each of the first plurality of beacons 301 has a first predetermined field of transmission 303 and a second predetermined field of transmission 309. Each of the second plurality of beacons 313 has a predetermined field of transmission 315.

The beacons 301 and 313 may be embedded in a walkway 307, such as a crosswalk in a road or street. The beacons 301 may be configured to transmit a first signal that is received by a mobile device 305 carried by a user when the mobile device 305 is within the first predetermined field of transmission 303 of the beacons 301. Upon receiving the signal, the mobile device 305 may be configured to determine that the signal was transmitted by a beacon 301 of a plurality of beacons 301 and to inhibit at least one function of the mobile device 305 upon determining that signal was transmitted by the beacon 301. In one embodiment, the first signal transmitted by a beacon 301 may the same or similar to a signal transmitted by a beacons 201, 101.

In addition, the beacons 301 may be configured to transmit a second signal that is received by a mobile device 305 when the mobile device 305 is within a second predetermined field of transmission 309 of a beacon 301. Accordingly, the mobile device 305 may be configured, such that when it receives the second signal from a plurality of beacons 301, to determine that the second signal was transmitted by the plurality of beacons 301 and to inhibit at least one function of the mobile device 305 upon determining that signal was transmitted by the plurality of beacons 301.

In the embodiment shown in FIG. 3, the mobile device 305 is configured to receive the second signal from at least three beacons 301 and upon determining that the mobile device 305 is located in the zone 311, the mobile device 305 may be configured to inhibit at least one function of the mobile device 305. The zone 311 may be sized and configured such that the zone 311 is defined where at least three of the second predetermined fields of transmission 309 intersect. In one embodiment, the mobile device 305 may be configured to determine that its location is within the zone 311 based on triangulation.

In addition, the beacons 313 may be configured to transmit a signal that is received by a mobile device 305 when the mobile device 305 is within the predetermined field of transmission 315 of the beacons 313. Upon receiving the signal, the mobile device 305 may be configured to determine that the signal was transmitted by a beacon 313 of a plurality of beacons 313 and to inhibit at least one function of the mobile device 305 upon determining that signal was transmitted by the beacon 313. In one embodiment, the signal transmitted by a beacon 313 may the same or similar to a signal transmitted by a beacon 301, 201, or 101.

Depending on the location of the mobile device 305 of the user, the mobile device 305 may receive signals from more than one beacon 301, 313 if a predetermined field of transmission 303, 315 overlaps another first predetermined field of transmission 303, 315. Additionally, the mobile device 305 may be configured to receive signals from different beacons 301, 313 as it moves through a predetermined field of transmission 303, 315 to another predetermined field of transmission 303, 315 and the mobile device 305 may be configured to inhibit a function accordingly.

As described herein, the signals transmitted by beacons may the same signal transmitted by each beacon or the signal transmitted by each beacon may be different in some aspects. For example, each beacon may transmit a signal with an identifier for a particular beacon, such as a unique identifier of the beacon that contains location information of that particular beacon. Accordingly, a mobile device may be configured to determine its location using the location information of a beacon. Additionally, a predetermined field of transmission of each beacon may be adjustable. For example, a first predetermined field of transmission may be adjustable according to a first parameter of a beacon and a second predetermined field of transmission may be adjustable according to a second parameter of the beacon.

In one embodiment, each of the beacons as referred to herein is an Apple iBeacon. An iBeacon is an indoor proximity system manufactured by Apple Inc. Apple calls its iBeacon device "a new class of low powered, low-cost transmitters that can notify nearby mobile devices of their presence." The iBeacon enables a smartphone or other device to perform actions when in close proximity to an iBeacon. One application is designed to help a smartphone determine its position or context. In another embodiment, each of the beacons may be used in conjunction with a Global Positioning System (GPS). Accordingly, any transmission between a mobile device and a beacon as described herein may be or may include GPS information, such as, for example, GPS coordinates. Location information can therefore be transmitted between devices that use GPS systems solely or in conjunction with other forms of location information. In additional embodiments, beacons may be replaced by or used in addition to locations identified in a GPS system. Accordingly, all disclosed functionality of a beacon may be implemented using locations identified in a GPS system.

With regard to FIG. 1, the plurality of beacons 101 may be replaced by a plurality of GPS location that each have predetermined range defined similar to the predetermined field of transmission 103, such that the GPS system sends a signal that is received by a mobile device carried by a user 105 when the user 105 is within the predetermined range. Further, the range can be adjusted to a predetermined distance from the GPS location. Upon receiving that signal, the mobile device may be configured to determine that the signal was transmitted by a GPS system and to inhibit at least one function of the mobile device upon determining that signal was transmitted by the GPS system.

Depending on the location of the mobile device of the user 105, the mobile device may receive multiple signals from the GPS system indicating that the mobile device is within a predetermined range of more than one GPS location. Similar to the embodiments described, the mobile device may be configured to determine that a second signal was transmitted by the GPS system and to inhibit the at least one function of the mobile device upon determining that the second signal was transmitted by the GPS system. In addition, the mobile device may be configured to receive additional signals from the GPS system and inhibit a function accordingly. Additionally, the mobile device may be configured to receive signals from the GPS system as it moves through a predetermined range of one GPS location to another predetermined range of another GPS location and the mobile device may be configured to inhibit a function accordingly.

The placement of the GPS locations may define a predetermined detection zone, such as a walkway and the predetermined range of each of the GPS locations may be configured such that the entirety of the walkway is covered by the predetermined range of at least one GPS location. Accordingly, as a user moves across the walkway and is within the boundaries of the walkway, which may be defined by the predetermined ranges of a plurality of GPS locations, at least one function of a mobile device being carried by the user will be interrupted. In one embodiment, the mobile device may continuously receive the signal from the GPS system when the mobile device is located within a predetermined detection zone, and the at least one function of the mobile device may no longer be inhibited after the mobile device no longer receives the signal from the GPS system. In one embodiment, the at least one function of the mobile device may no longer be inhibited following a predetermined time period after the mobile device no longer receives the signal from the GPS system. Similar operation of the mobile device and GPS locations may be implemented with regard to the functionality of beacons as described with regard to FIGS. 2 and 3.

In one example, with the help of an iBeacon, a smartphone's software may approximate its own location in a store. In addition, iBeacons may help a phone show notifications of items nearby that are on sale, and they may enable payments at the point of sale where customers don't need to remove their wallets or cards to make payments. In one example, iBeacon technology uses Bluetooth Low Energy (BLE) technology, also known as Bluetooth Smart. iBeacon may use BLE proximity sensing to transmit a universally unique identifier picked up by a compatible app or operating system. The identifier may then be looked up over the internet to determine a device's physical location or trigger an action on the device such as a check-in on social media or a push notification. Various vendors have made hardware iBeacons that come in a variety of form factors, including small coin cell devices, USB sticks, and generic Bluetooth 4.0 capable USB dongles.

iBeacons devices are compatible with the following mobile devices:

Android 4.3 or later (e.g. Samsung Galaxy S3/S4/S4 Mini, Samsung Galaxy Note 2/3, HTC One, Google/LG Nexus 7 2013 version/Nexus 4/Nexus 5, HTC Butterfly)

iOS devices with Bluetooth 4.0 and iOS 7 or later:

iPhone 4s or later iPad (3rd generation) or later iPad mini or later iPod touch (5th generation) or later Windows Phone devices with the Lumia Cyan update or later In one embodiment, a mobile device may be rendered either inoperable or operable only in a state of limited capacity upon a determination that the mobile device is located within the predetermined detection zone. Accordingly, a control module associated with a mobile device may be able to either completely block the ability to receive or send a call on a mobile device, or sufficiently interfere with a function of the mobile device so as to make the mobile device usage undesirable. In embodiments, a control module may disable the operation of certain components or functions of the mobile device. For example, a keyboard portion of a mobile device may be disabled to prevent the user from using a text messaging function or an email function of the mobile device. In another embodiment, the control module may direct the operation of the mobile device to a hands-free operation.

In another embodiment, outgoing communication functions may be inhibited, but incoming communication functions may be uninhibited. In another embodiment, automatic replies may be initiated during a period in which a function of the mobile device is inhibited. In another example, some calls or messages, such as emergency calls or messages, may be permitted to be placed while other outgoing calls or messages are inhibited. In one embodiment, calls that are ongoing or initiated prior to a mobile device entering a predetermined detection zone may be permitted but new calls may be inhibited. Additionally, the at least one function of the mobile device that is to be inhibited may be a text messaging service function or a display screen function. Additionally, any other function of the mobile device that may be detected may be selectively permitted or disabled.

In embodiments described herein, a predetermined detection zone may be defined as a three-dimensional zone within or in proximity of a walkway, such as a vehicle; however, the predetermined detection zone need not be within or in proximity of a walkway and may be any predetermined zone as appropriate. For instance, the predetermined detection zone may be an area within a room in a building.

Figure 4:
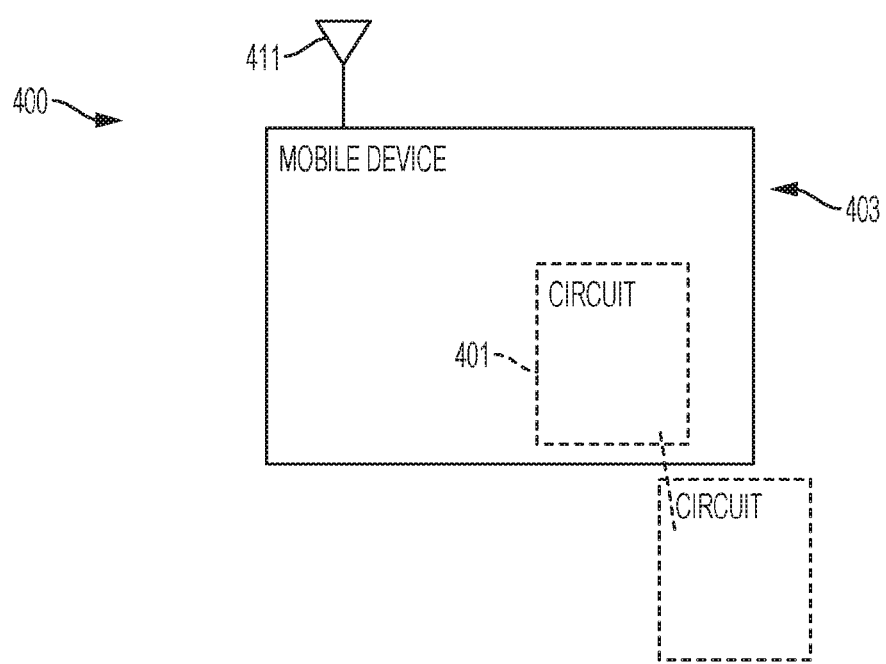
FIG. 4 illustrates one embodiment of a mobile device to be used with a system for determining the presence of a mobile device located in a predetermined detection zone according to the present disclosure.

An embodiment of a mobile device 400 that may be used in accordance with the systems described with regard to FIGS. 1-3, is shown in FIG. 4. The mobile device 403 comprises a circuit 401 associated with the mobile device 403. The circuit 401 may comprise a processor configured to determine a location of the mobile device 403. In one embodiment, the circuit 401 may be configured to cause a signal to be transmitted from the mobile device 403 to a plurality of beacons, which after being received by the plurality of beacons, causes the plurality of beacons to transmit a signal with information regarding the beacons. In one embodiment, the signal transmitted by the plurality of beacons may include information associated or a portion of the signal transmitted by the mobile device 403 along with information about a particular beacon, such as a unique identifier of the beacon or similar identification information. The signal may be received via an antenna 411 of the mobile device 403. The antenna 411 may be a component of the primary communication scheme of the mobile device 403 or a component of a secondary communication scheme of the mobile device, such as Bluetooth. Once an appropriate signal is received, operation of the mobile device may be controlled in one or more ways.

Additionally, the circuit 401 may be configured to determine the location of the mobile device 403 and to determine whether the location of the mobile device 403 matches a predetermined detection zone. As shown in the embodiment of FIG. 8, the circuit 401 may be located within the mobile device 403 or it may be communicatively coupled to the mobile device 403 such that control and/or command signals can be exchanged between the circuit 401 and the mobile device 403.

Furthermore, in embodiments, the circuit 401 may comprise a control module associated with the mobile device 403, where the control module 401 is coupled to a non-transitory memory that stores executable instructions, and where the control module 401 is operable to execute the instructions stored in the memory. The control module 401 may be operable to execute the instructions to cause a signal to be transmitted from the mobile device 403 to a plurality of beacons, to determine whether the location of the mobile device 403 matches a predetermined detection zone, and inhibit at least one function of the mobile device 403 upon determining that the mobile device is within a predetermined detection zone. In one embodiment, the control module 401 may be located within the mobile device. In another embodiment, the control module 401 may be in communication with the mobile device through a communication network, such as a wireless communication network.

In embodiments, the systems and methods of the present disclosure may comprise components that are hardware, software, or combinations thereof. In one embodiment, the software may be an application that is able to be installed on a mobile device, such as a smartphone, tablet, etc. In embodiment, a mobile application may be configured to run on mobile devices such as Android devices, iPhone and various wearable devices.

Demonstrative configurations were developed using beacons and a mobile application for a manufacturer of a specific mobile device. In one instance, a configuration was built using Estimote® beacons and an Android mobile application and an iPhone® mobile application. In another instance, a configuration was built using a beacon supplied by Onyx Beacons® and an iPhone® mobile application. The beacon supplied by Onyx Beacons® may have a transmission range of up to about 230 feet (about 70 m). The beacon supplied by Estimote® may have a transmission range that can vary from about 4 inches (about 0.1 m) to about 200 feet (about 61 m).

According to a passive method implementation, a method of localization was used such that it was simple and reliable. The beacons may be embedded into pavement of a crosswalk. In this configuration, these beacons were referred to as "ground beacons". Each ground beacon was configured to have a circular area with a known radius of transmission, also referred to as a predetermined field of transmission. The ground beacons were distributed uniformly to get the maximum coverage of a crosswalk. The number of beacons required may depend on the surface of the crosswalk. Every beacon had a short circular area with a known radius of transmission. The beacons were configured to send their distance to the smartphone and the smartphone was configured to determine if the distance to a beacon was smaller than a preset radius then it was determined that the user was on the crosswalk. The radius of the ground beacons was able to be modified by changing a "short distance" parameter. In the demonstrative configuration, 6 beacons were used: two rows of 3 beacons each, set 6.5 feet (2 meters) apart and consistent results were received.

According to an active method implementation, 4 beacons were placed on four corners of the crosswalk. These beacons were referred to as "pole beacons". Each pole beacon was configured to have a circular area with a known radius of transmission, also referred to as a predetermined field of transmission, similar to a ground beacon used in the passive method above but the pole beacons also had a second, larger circular area of transmission. The application was configured to determine that a user was on the crosswalk in either of these two cases:

when the smartphone is inside any of the four small circular areas; or when the smartphone is inside an area formed by the intersection of any of three larger circular areas.

The radius of the larger circular areas was able to be set by modifying a "long distance" parameter of a beacon. In some instances the active method yielded less reliable results than the passive method due to intrinsic inaccuracies of the beacons used. A third method combined aspects of the first two methods. Four pole beacons were used that were complemented by two or more ground beacons. Advantages of this method are that it uses less ground beacons and it provides accurate results.

Figures 5A, 5B:
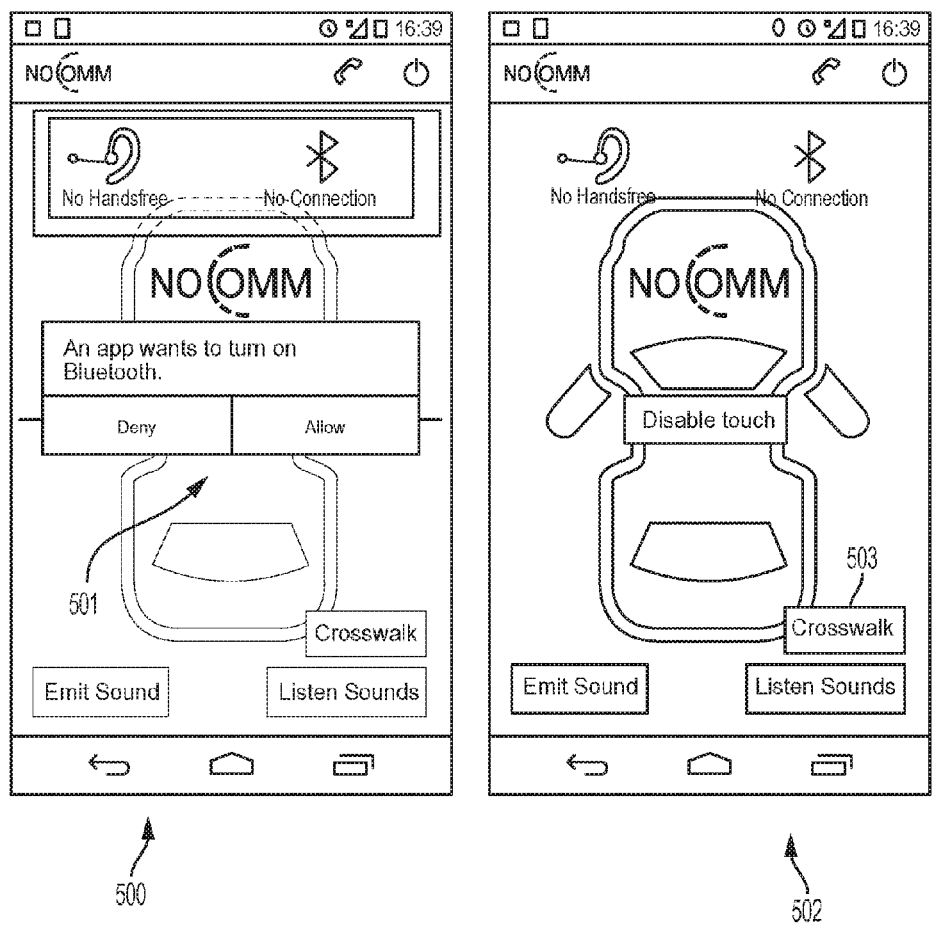

An embodiment of a mobile application according to the present disclosure is shown in FIGS. 5a-8b. Accordingly, as shown in FIG. 5a, after launching a general application, a user interface 500 may be displayed that provides a prompt 501 to a user to allow the mobile application to activate a Bluetooth module. As a non-limiting example, the display may include a text box with the text, "An app wants to turn on Bluetooth." The display may also include touch activated buttons with indicators "Deny" (to allow a user to prevent the app from running) and "Allow" (to allow a user to permit the app to run). As shown in FIG. 5b, after the user provides an input that activates the Bluetooth module, a user may be presented with a user interface 502 for the general application, such as for example a "NoComm Driver" or "NoComm" application. The user interface may include a graphical representation of the name of the application, for example "noComm." To access the mobile application, such as a "NoComm Crosswalk" function of a "NoComm Driver" application, a user is required to provide an appropriate input. As a non-limiting example, the interface may present the user with a touch activated button 503 have a text indicator such as "Crosswalk" As shown in the interface 502, the input may be received by the user contacting the "Crosswalk" button 503.

Figures 6A, 6B:
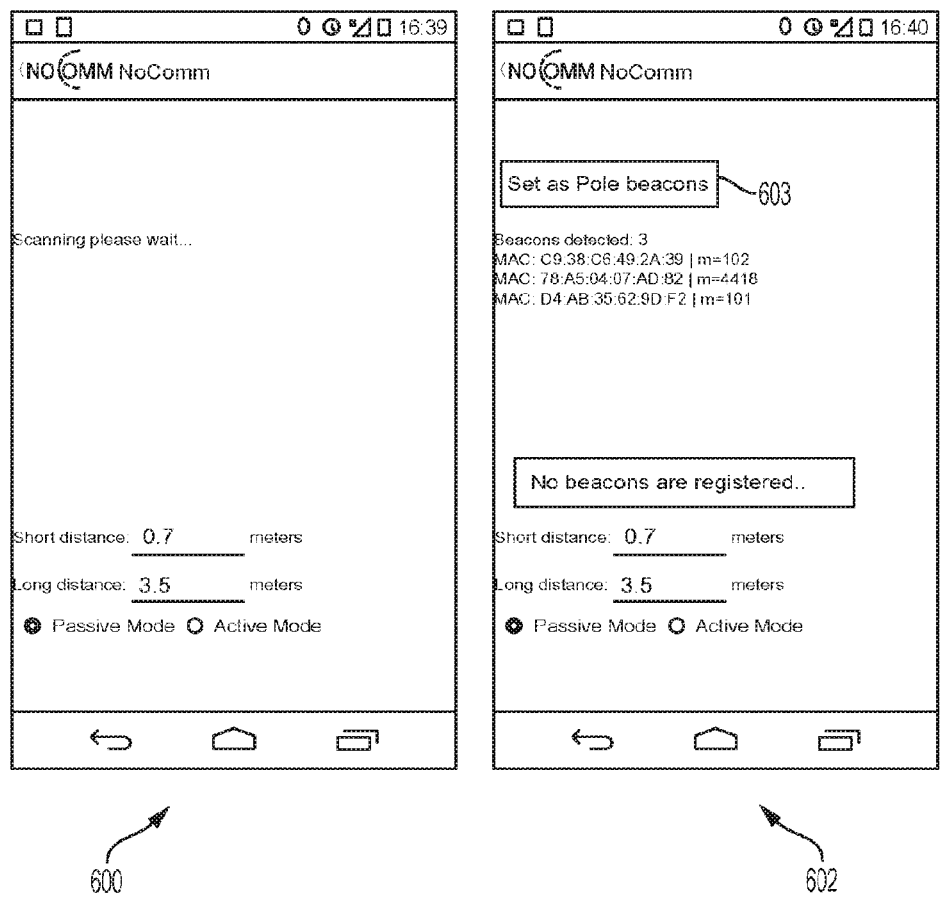

Upon accessing the mobile application, as shown in the interface 600 of FIG. 6a, the mobile application may initially search for beacons and may also check if any beacons have been previously registered with the mobile application. During the time that the application searches for beacons, the interface may display an indicator, such as a text box containing the text, "Scanning, please wait . . . " If no beacons have been previously registered, the mobile application may be configured to enter a register mode. The registration mode may display an interface 602 (see FIG. 6b) providing a text indicator, such as "No beacons are registered . . . "

In the register mode, the mobile application displays a plurality of beacons that are detected by the crosswalk mobile application. The user is able to choose beacons that are going to be considered as pole beacons. This may be accomplished by deactivating other beacons in a particular area. In one embodiment, beacons may be deactivated remotely, by removing their batteries, or by putting the beacons in a container that blocks their signal, such as for example a metal can. Once the undesired beacons are deactivated, as shown in the interface 602 of FIG. 6b, the mobile application may display only the beacons that are to be registered as pole beacons. As a non-limiting example, the application may display the number of beacons detected and information related to each beacon, such as a MAC address, a UUID, a major value and a minor value. A non-limiting example of a format of such a display may be:

iBeacons detected: 3
MAC: C9:38:C6:49:2A:39| m=102
MAC: 78:A5:04:07:AD:82| m=4418
MAC: D4:AB:35:62:9D:F2| m=101

However, the display may display text in any appropriate format. As a non-limiting example, the text may display and the user is presented with a prompt 603 to set the displayed beacons as pole beacons. Such a prompt 603 may be displayed within a text box or as a touch sensitive button bearing a text indicator such as "Set as Pole beacons."

Figures 7A, 7B, 7C:
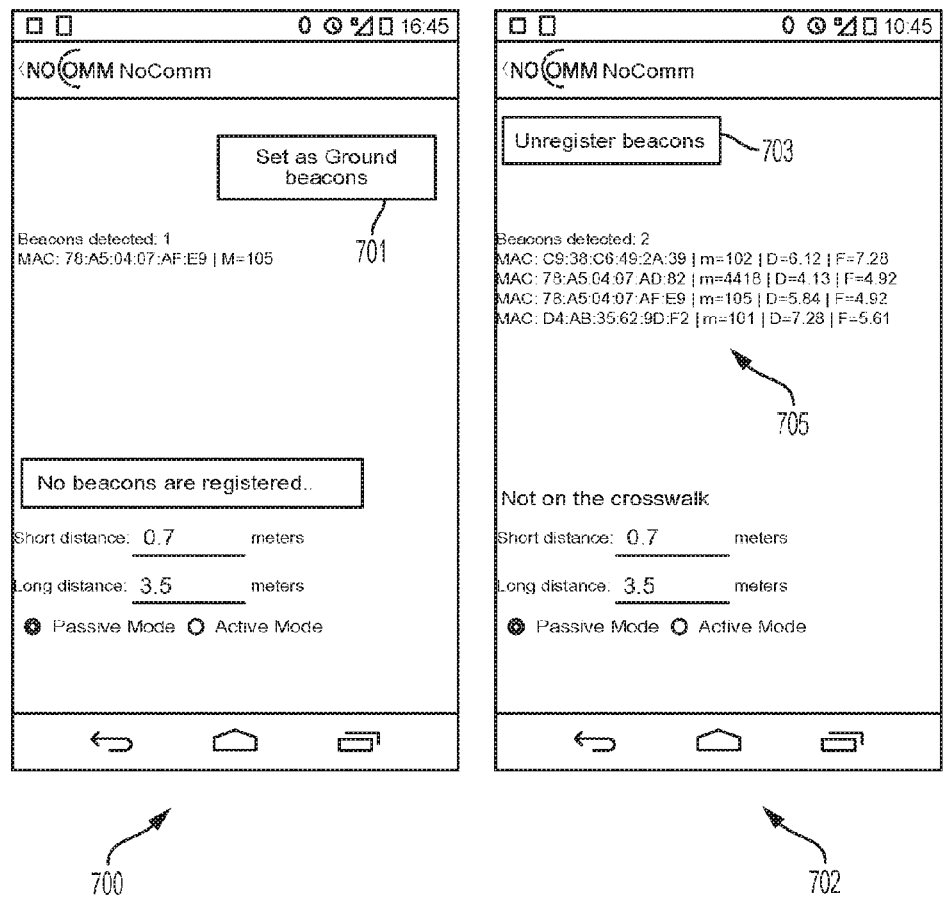
FIGS. 7a-7c illustrate display screens presented by a mobile application for determining the presence of a mobile device located in a predetermined detection zone according to the present disclosure.

After the pole beacons are registered, a user may be provided with a way to set ground beacons. A user may be to disable or deactivate all the other beacons and, as shown in FIG. 7a, an interface may be provided with an interface 700 that displays at least one beacon. As a non-limiting example, the application may display the number of beacons and information related to each beacon, such as a MAC address, a UUID, a major value and a minor value. A non-limiting example of a format of such a display may be:

iBeacons detected: 1
MAC: 78:A5:04:07:AF:E9| m=105

A user may then be prompted to set the displayed beacons as ground beacons, for example, by using a touch enabled button 701 that may include text such as "Set as Ground beacons". The mobile application may be configured to save the beacon settings in a file that is able to be read each time the mobile application is accessed. After registering all beacons, as shown in FIG. 7b, a user may be provided with interface 702 that provides an option to a user to unregister the beacons. As shown in FIG. 7b, the beacons may be unregistered by a user activating a touch enabled button 703 that may include text such as "Unregister beacons". Also, the mobile application may be running in a localization mode and it may show all beacons that it detects along with relevant information 705 about the beacons. As a non-limiting example, the application may display the number of beacons detected and information related to each beacon, such as a MAC address, a UUID, a major value, a minor value, the instant distance, and the filtered distance parameters of a particular beacon. A non-limiting example of a format of such a display may be:

iBeacons detected: 2
MAC: C9:38:C6:49:2A:39| m=102| D=6.12| F=7.28
MAC: 78:A5:04:07:AD:82| m=4418| D=4.13| F=4.92
MAC: 78:A5:04:07:AF:E9| m=105| D=5.84| F=4.92
MAC: D4:AB:35:62:9D:F2| m=101| D=7.28| F=5.61

FIG. 7c shows another embodiment of information regarding the beacons that may be displayed by interface 702. The MAC, minor, the instant distance and the filtered distance parameters of a particular beacon may be displayed. The display may also indicate the type of beacon such as a pole beacon or a ground beacon. For example, the display interface may include a text box having a title line "Text Editor—registered_beacon.txt" and may include data having a format such as, for example, MAC: C9:38:C6:49:2A:39 102 POLE
MAC: 78:A5:04:07:AD:82 4418 POLE
MAC: D4:AB:35:62:9D:F2 101 POLE
MAC: 78:A5:04:07:AF:E9 105 GROUND In the embodiment shown in FIGS. 6a-7b, a user may be able to set a short distance and a long distance of a beacon, which may correspond to a first predetermined field of transmission and a second predetermined filed of transmission, during a registration process. As non-limiting examples, the Short distance may be set to 0.7 meters and the long distance may be set to 3.5 meters. Further, in the event that the beacon is registered as a beacon having only one predetermined field of transmission, a user may be able to select which of the values should be used as the predetermined field of transmission value. In addition, the range of values that may be set for these fields may depend on a particular type of beacon that is used.

In addition, as shown in FIGS. 6a-7b, a user may be able to switch at any time between two detection modes, such as a passive mode and an active mode, by selecting an appropriate radio buttons. Depending on the detection mode, if the distances of the beacons match the condition needed for a mobile device to be considered located on a predetermined detection zone, a function of the mobile device screen is inhibited. For example, a screen of the mobile device may be blocked.

Figures 8A, 8B:
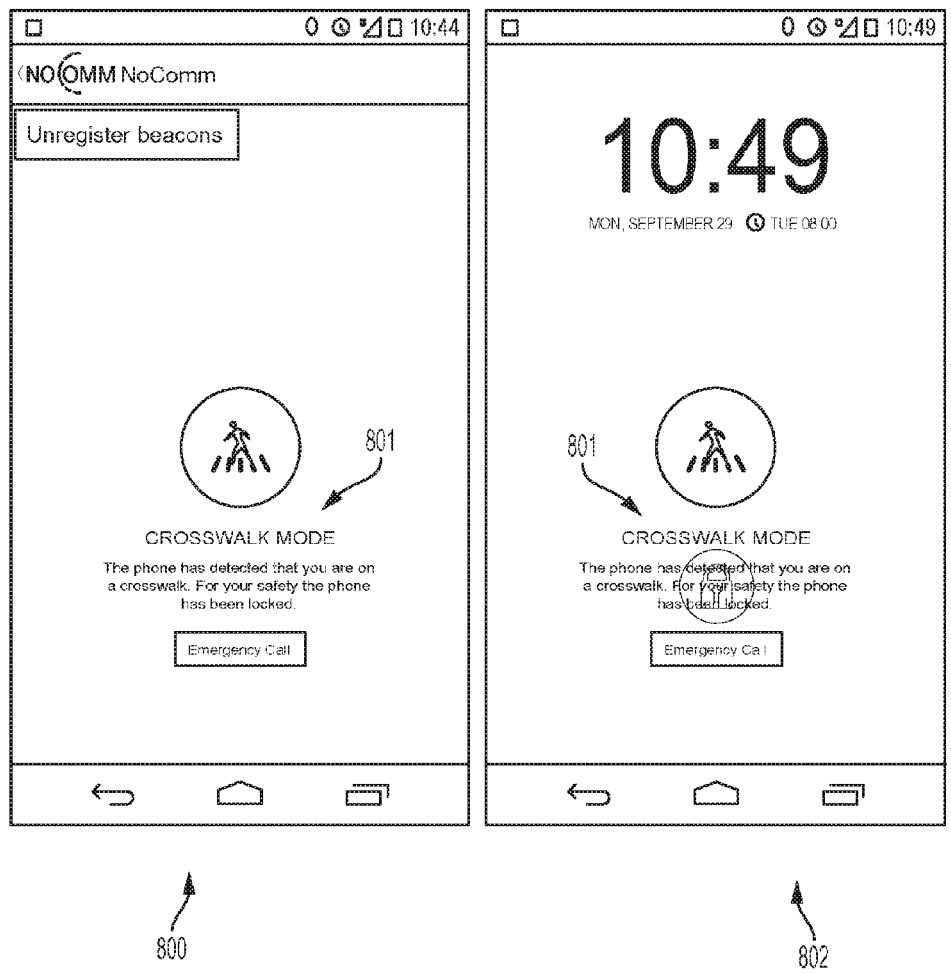
FIGS. 8a and 8b illustrate display screens presented when a mobile application according to the present disclosure inhibits a function of a mobile device by a mobile application.

FIGS. 8a and 8b display screens 800 and 802 that are examples of the display that is shown when the mobile application inhibits a function of a mobile device. When the mobile application detects that the mobile device is on a crosswalk, it blocks the screen and the only allowable action the user can take is to make an Emergency Call. The screens 800 and 802 show the information 801 that is displayed to a user when the mobile device screen is blocked. As a non-limiting example, the mobile device may display text, such as:

CROSSWALK MODE:
The phone has detected that you are on a crosswalk. For your safety the phone has been locked.

As a further non-limiting example, the mobile device may display a graphical design, such as a circle inclosing a human figure walking on an area depicted with lines that are similar to those found on a street to indicate a crosswalk area. Additionally, the display may include a touch actuated button bearing the text "Emergency Call" that may be depressed by a user to make an emergency call. As shown in FIG. 8b, the mobile application will also work in the background, blocking the screen even if the user is using other applications in the foreground.

An embodiment of the mobile application was tested on an LG Nexus 5 smartphone with Android 4.4.4 installed. It has been found that the accuracy of readings may vary depending on at least some of the following factors: the orientation of the smartphone (how the pedestrian is holding his phone); if the phone has a case or not; if the crosswalk is crowded or not (the human bodies can absorb the signals from the beacons and interfere with the results); and the model of the phone (every different phone has different performance regarding reception of Bluetooth signals).

In various embodiments, a mobile device as referred to herein may be implemented as a handheld portable device, computer, mobile telephone, sometimes referred to as a smartphone, tablet personal computer (PC), laptop computer, or any combination thereof. Non-limiting examples of smartphones include, for example, Palm® products such as Palm® Treo® smartphones (now Hewlett Packard or HP), Blackberry® smart phones, Apple® iPhone®, Motorola Droid®, and the like. Tablet devices include the iPad® tablet computer by Apple® and more generally a class of lightweight portable computers known as Netbooks. In some embodiments, the mobile device may be comprise, or be implemented as, any type of wireless device, mobile station, or portable computing device with a self-contained power source (e.g., battery) such as a laptop computer, ultra-laptop computer, personal digital assistant (PDA) with communications capabilities, cellular telephone, combination cellular telephone/PDA, mobile unit, subscriber station, user terminal, portable computer, handheld computer, palmtop computer, wearable computer, media player, pager, messaging device, data communication device, and so forth.

Accordingly, systems and methods of detecting the location and/or presence of the mobile device may vary based on the wireless technology communication standards used by the mobile device. Examples of wireless technology communication standards that may be used In the United States, for example, may include Code Division Multiple Access (CDMA) systems, Global System for Mobile Communications (GSM) systems, North American Digital Cellular (NADC) systems, Time Division Multiple Access (TDMA) systems, Extended-TDMA (E-TDMA) systems, Narrowband Advanced Mobile Phone Service (NAMPS) systems, 3G systems such as Wide-band CDMA (WCDMA), 4G systems, CDMA-2000, Universal Mobile Telephone System (UMTS) systems, Integrated Digital Enhanced Network (iDEN) (a TDMA/GSM variant) and so forth.

In various embodiments, the mobile device may be configured to provide voice and/or data communications functionality in accordance with different types of wireless network systems or protocols. Examples of suitable wireless network systems offering data communication services may include the Institute of Electrical and Electronics Engineers (IEEE) 802.xx series of protocols, such as the IEEE 802.1a/b/g/n series of standard protocols and variants (also referred to as "WiFi"), the IEEE 802.16 series of standard protocols and variants (also referred to as "WiMAX"), the IEEE 802.20 series of standard protocols and variants, and so forth. Additionally, the mobile device 205 may utilize different types of shorter range wireless systems, such as a Bluetooth system operating in accordance with the Bluetooth Special Interest Group (SIG) series of protocols, including Bluetooth Specification versions v1.0, v1.1, v1.2, v1.0, v2.0 with Enhanced Data Rate (EDR), as well as one or more Bluetooth Profiles, and so forth. Other examples may include systems using infrared techniques or near-field communication techniques and protocols, such as electromagnetic induction (EMI) techniques. An example of EMI techniques may include passive or active radio-frequency identification (RFID) protocols and devices.

A mobile device may also utilize different types of shorter range wireless systems, such as a Bluetooth system operating in accordance with the Bluetooth Special Interest Group (SIG) series of protocols, including Bluetooth Specification versions v1.0, v1.1, v1.2, v1.0, v2.0 with Enhanced Data Rate (EDR), as well as one or more Bluetooth Profiles, and so forth. Other examples may include systems using infrared techniques or near-field communication techniques and protocols, such as electromagnetic induction (EMI) techniques. An example of EMI techniques may include passive or active radio-frequency identification (RFID) protocols and devices. These wireless communications standards are understood by one of ordinary skill in the art.

In various embodiments, a user may comprises an individual or entity that has authority over where an individual or pedestrian is walking and may operate in a manner that will not require the individual or pedestrian to opt-in. For example, the user may be a government entity, such as, for example, a municipality or a law enforcement entity, a construction site operator, a building owner, a store owner, a landowner, etc. In embodiments, the systems and methods of the present disclosure may comprise components and elements that allow it to be used as a geographic fence. In embodiments, systems and methods are disclosed herein that allow for applications at construction sites to prevent pedestrians and/or workers from getting too close to the edge of a building for example. In additional embodiments, systems and methods are disclosed herein that allow for applications that could be used at train/subway stations to prevent riders from walking off an edge of a platform.

The various illustrative functional elements, logical blocks, modules, circuits, and processors described in connection with the embodiments disclosed herein may be implemented or performed with an appropriate processor device, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein as appropriate. As described herein a processor may be a microprocessor, but in the alternative, the processor may be any conventional processor, controller, microcontroller, or state machine designed to perform the appropriate function. A processor may be part of a computer system that also has a user interface port that communicates with a user interface, and which receives commands entered by a user, has at least one memory (e.g., hard drive or other comparable storage, and random access memory) that stores electronic information including a program that operates under control of the processor and with communication via the user interface port, and a video output that produces its output via any kind of video output format.

The functions of the various functional elements, logical blocks, modules, and circuits elements described in connection with the embodiments disclosed herein may be performed through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the terms "processor" or "module" should not be construed to refer exclusively to hardware capable of executing software, and may implicitly include, without limitation, DSP hardware, read-only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

The various functional elements, logical blocks, modules, and circuits elements described in connection with the embodiments disclosed herein may comprise a processing unit for executing software program instructions to provide computing and processing operations for the systems and methods described herein. A processing unit may be responsible for performing various voice and data communications operations between the mobile device and other components of an appropriate system. Although the processing unit may include a single processor architecture, it may be appreciated that any suitable processor architecture and/or any suitable number of processors in accordance with the described embodiments. In one embodiment, the processing unit may be implemented using a single integrated processor.

The functions of the various functional elements, logical blocks, modules, and circuits elements described in connection with the embodiments disclosed herein may also be implemented in the general context of computer executable instructions, such as software, control modules, logic, and/or logic modules executed by the processing unit. Generally, software, control modules, logic, and/or logic modules include any software element arranged to perform particular operations. Software, control modules, logic, and/or logic modules can include routines, programs, objects, components, data structures and the like that perform particular tasks or implement particular abstract data types. An implementation of the software, control modules, logic, and/or logic modules and techniques may be stored on and/or transmitted across some form of computer-readable media. In this regard, computer-readable media can be any available medium or media useable to store information and accessible by a computing device. Some embodiments also may be practiced in distributed computing environments where operations are performed by one or more remote processing devices that are linked through a communications network. In a distributed computing environment, software, control modules, logic, and/or logic modules may be located in both local and remote computer storage media including memory storage devices.

Additionally, it is to be appreciated that the embodiments described herein illustrate example implementations, and that the functional elements, logical blocks, modules, and circuits elements may be implemented in various other ways which are consistent with the described embodiments. Furthermore, the operations performed by such functional elements, logical blocks, modules, and circuits elements may be combined and/or separated for a given implementation and may be performed by a greater number or fewer number of components or modules. As will be apparent to those of skill in the art upon reading the present disclosure, each of the individual embodiments described and illustrated herein has discrete components and features which may be readily separated from or combined with the features of any of the other several aspects without departing from the scope of the present disclosure. Any recited method can be carried out in the order of events recited or in any other order which is logically possible.

It is worthy to note that any reference to "one embodiment" or "an embodiment" means that a particular feature, structure, or characteristic described in connection with the embodiment is included in at least one embodiment. The appearances of the phrase "in one embodiment" or "in one aspect" in the specification are not necessarily all referring to the same embodiment.

Unless specifically stated otherwise, it may be appreciated that terms such as "processing," "computing," "calculating," "determining," or the like, refer to the action and/or processes of a computer or computing system, or similar electronic computing device, such as a general purpose processor, a DSP, ASIC, FPGA or other programmable logic device, discrete gate or transistor logic, discrete hardware components, or any combination thereof designed to perform the functions described herein that manipulates and/or transforms data represented as physical quantities (e.g., electronic) within registers and/or memories into other data similarly represented as physical quantities within memories, registers or other such information storage, transmission or display devices.

It is worthy to note that some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. With respect to software elements, for example, the term "coupled" may refer to interfaces, message interfaces, application program interface (API), exchanging messages, and so forth.

It will be appreciated that those skilled in the art will be able to devise various arrangements which, although not explicitly described or shown herein, embody the principles of the present disclosure and are included within the scope thereof. Furthermore, all examples and conditional language recited herein are principally intended to aid the reader in understanding the principles described in the present disclosure and the concepts contributed to furthering the art, and are to be construed as being without limitation to such specifically recited examples and conditions. Moreover, all statements herein reciting principles, aspects, and embodiments as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present disclosure, therefore, is not intended to be limited to the example aspects and aspects shown and described herein. Rather, the scope of present disclosure is embodied by the appended claims.

The terms "a" and "an" and "the" and similar referents used in the context of the present disclosure (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or example language (e.g., "such as", "in the case", "by way of example") provided herein is intended merely to better illuminate the present disclosure and does not pose a limitation on the scope of the present disclosure otherwise claimed. No language in the specification should be construed as indicating any non-claimed element essential to the practice of the present disclosure. It is further noted that the claims may be drafted to exclude any optional element. As such, this statement is intended to serve as antecedent basis for use of such exclusive terminology as solely, only and in connection with the recitation of claim elements, or use of a negative limitation.

Groupings of alternative elements or embodiments disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability.

While certain features of the embodiments have been illustrated as described above, many modifications, substitutions, changes and equivalents will now occur to those skilled in the art. It is therefore to be understood that the appended claims are intended to cover all such modifications and changes as fall within the scope of the disclosed embodiments. Various aspects of the subject matter described herein are set out in the following numbered clauses:

Clause 1. A method for inhibiting a function of a mobile device in a predetermined detection zone, the method comprising:

receiving, by a mobile device located within a predetermined field of transmission, a first communication signal;

determining that the first communication signal was transmitted by a first beacon of a plurality of beacons; and inhibiting at least one function of the mobile device upon determining that the first communication signal was transmitted by the first beacon.

Clause 2. The method of clause 1, wherein the predetermined field of transmission is a first predetermined field of transmission, and the method further comprising receiving, by a mobile device located within a second predetermined field of transmission, a second communication signal;

determining that the second communication signal was transmitted by a second beacon of the plurality of beacons located within the predetermined detection zone; and inhibiting the at least one function of the mobile device upon determining that the second communication signal was transmitted by the second beacon.

Clause 3. The method of clause 2, further comprising receiving, by a mobile device located within a third predetermined field of transmission, a third communication signal;

determining that the third communication signal was transmitted by a third beacon of the plurality of beacons located within the predetermined detection zone; and inhibiting at least one function of the mobile device upon determining that the third communication signal was transmitted by the third beacon.

Clause 4. The method of clause 3, further comprising receiving, by a mobile device located within a fourth predetermined field of transmission, a fourth communication signal;

determining that the fourth communication signal was transmitted by the first beacon;

receiving, by a mobile device located within a fifth predetermined field of transmission, a fifth communication signal;

determining that the first communication signal was transmitted by the second beacon;

receiving, by a mobile device located within a sixth predetermined field of transmission, a sixth communication signal;

determining that the sixth communication signal was transmitted by the third beacon;

determining that the mobile device is in a location defined by an intersection of the fourth predetermined field of transmission, the fifth predetermined field of transmission, and the sixth predetermined field of transmission; and inhibiting the at least one function of the mobile device upon determining that the mobile device is in the location defined by the intersection of the fourth predetermined field of transmission, the fifth predetermined field of transmission, and the sixth predetermined field of transmission.

Clause 5. The method of any one of clauses 1 through 4, wherein the at least one function of the mobile device is a text messaging service function or a display screen function.

Clause 6. The method of clause 2, wherein the first predetermined field of transmission overlaps the second predetermined field of transmission.

Clause 7. The method of clause 3, wherein the second predetermined field of transmission overlaps the third predetermined field of transmission.

Clause 8. The method of clause 2, further comprising:

receiving, by a mobile device located within a third predetermined field of transmission, a third communication signal;

determining that the third communication signal was transmitted by a third beacon;

receiving, by the mobile device located within the predetermined detection zone, a fourth communication signal;

determining that the fourth communication signal was transmitted by a fourth beacon;

receiving, by the mobile device located within the predetermined detection zone, a fifth communication signal;

determining that the fifth communication signal was transmitted by a fifth beacon;

determining that the third communication signal, the fourth communication signal, and the fifth communication signal are received simultaneously by the mobile device; and inhibiting the at least one function of the mobile device upon determining that the third communication signal, the fourth communication signal, and the fifth communication signal are received within a predetermined period of time by the mobile device.

Clause 9. The method of any one of clauses 1 through 8, wherein the mobile device located within the predetermined detection zone receiving the first communication signal comprises the mobile device located within the predetermined detection zone continuously receiving the first communication signal, and the method further comprising permitting the at least one function of the mobile device following a predetermined time period after the mobile device no longer receives the first communication signal.

Clause 10. The method of any one of clauses 1 through 9, wherein the first predetermined field of transmission is adjustable according to a parameter of the first beacon.

Clause 11. A system for inhibiting a function of a mobile device in a predetermined detection zone, the system comprising:

a plurality of beacons comprising a first beacon and a second beacon; and wherein the first beacon is configured to transmit a first communication signal within a first predetermined field of transmission to a mobile device located within the first predetermined field of transmission of the first beacon and to cause the mobile device to inhibit at least one function of the mobile device based on the first communication signal transmitted by the first beacon; and wherein the second beacon is configured to transmit a second communication signal within a second predetermined field of transmission to the mobile device located within the second predetermined field of transmission of the second beacon and to cause the mobile device to inhibit at least one function of the mobile device based on the second communication signal transmitted by the second beacon.

Clause 12. The system of clause 11, wherein each of the plurality of beacons is permanently attached to a walkway.

Clause 13. The system of any one of clauses 11 through 12, wherein the first predetermined field of transmission is adjustable according to a first parameter of the first beacon and wherein the second predetermined field of transmission is adjustable according to a second parameter of the second beacon.

Clause 14. The system of any one of clause 11-13, wherein the plurality of beacons comprises a third beacon; and wherein the third beacon is configured to transmit a third communication signal within a third predetermined field of transmission to a mobile device located within the third predetermined field of transmission of the third beacon and is configured to cause the mobile device to inhibit at least one function of the mobile device based on the third communication signal transmitted by the third beacon.

Clause 15. The system of clause 14, wherein the first beacon is configured to transmit a fourth communication signal within a fourth predetermined field of transmission; and wherein the second beacon is configured to transmit a fifth communication signal within a fifth predetermined field of transmission;

wherein the third beacon is configured to transmit a sixth communication signal within a sixth predetermined field of transmission; and wherein the first beacon, the second beacon, and the third beacon are configured to cause the mobile device to inhibit at least one function of the mobile device based on determining that the mobile device is in the location defined by the intersection of the fourth predetermined field of transmission, the fifth predetermined field of transmission, and the sixth predetermined field of transmission.

Clause 16. A communications apparatus for inhibiting a function of a mobile device in a predetermined detection zone, the apparatus comprising:

a mobile device; and a control module associated with the mobile device; and wherein the control module is configured to receive a first communication signal transmitted by a first beacon of a plurality of beacons from a mobile device located within a first predetermined field of transmission of the first beacon;

wherein the control module is configured to inhibit at least one function of the mobile device based on the first communication signal transmitted by the first beacon.

Clause 17. The apparatus of clause 16, wherein the control module is configured to inhibit a text messaging service function or display screen function of the mobile device.

Clause 18. The apparatus of clause 17, wherein the control module is configured to receive a second communication signal transmitted by a second beacon of the plurality of beacons for a mobile device located within a second predetermined field of transmission of the second beacon;

wherein the control module is configured to inhibit at least one function of the mobile device based on the second communication signal transmitted by the second beacon;

wherein the control module is configured to receive a third communication signal transmitted by a third beacon from a mobile device located within a third predetermined zone of transmission of the third beacon; and wherein the control module is configured to inhibit at least one function of the mobile device based on the third communication signal transmitted by the third beacon.

Clause 19. The apparatus of clause 18, wherein the control module is configured to receive a fourth communication signal transmitted by the first beacon for a mobile device located within a fourth predetermined zone of transmission of the first beacon;

wherein the control module is configured to receive a fifth communication signal transmitted by the second beacon for a mobile device located within a fifth predetermined zone of transmission of the second beacon;

wherein the control module is configured to receive a sixth communication signal transmitted by the third beacon for a mobile device located within a sixth predetermined zone of transmission of the third beacon; and wherein the control module is configured to inhibit the at least one function of the mobile device based on determining that the mobile device is in a location defined by the intersection of the fourth predetermined field of transmission, the fifth predetermined field of transmission, and the sixth predetermined field of transmission.

Clause 20. A method for inhibiting a function of a mobile device in a predetermined detection zone, the method comprising:

receiving, by a mobile device located within a first predetermined field of transmission, a first communication signal;

receiving, by a mobile device located within a second predetermined field of transmission, a second communication signal;

receiving, by a mobile device located within a third predetermined field of transmission, a third communication signal;

inhibiting the at least one function of the mobile device based on determining that the mobile device is in the location defined by the intersection of the first predetermined field of transmission, the second predetermined field of transmission, and the third predetermined field of transmission.

Clause 21. The method of clause 20, wherein the at least one function of the mobile device is a text messaging service function or a display screen function.

Clause 22. The method of clause 21, further comprising determining that the first communication signal was transmitted by a first beacon of a plurality of beacons;

determining that the second communication signal was transmitted by a second beacon of the plurality of beacons; and determining that the third communication signal was transmitted by a third beacon of the plurality of beacons.

The invention claimed is:

1. A method for inhibiting a function of a mobile device in a predetermined detection zone, the method comprising:

receiving, by a mobile device located within a first predetermined field of transmission, a first communication signal;

determining that the first communication signal was transmitted by a first beacon of a plurality of beacons;

inhibiting at least one function of the mobile device upon determining that the first communication signal was transmitted by the first beacon;

receiving, by a mobile device located within a second predetermined field of transmission, a second communication signal;

determining that the second communication signal was transmitted by a second beacon of the plurality of beacons located within the predetermined detection zone;

inhibiting the at least one function of the mobile device upon determining that the second communication signal was transmitted by the second beacon;

receiving, by a mobile device located within a third predetermined field of transmission, a third communication signal;

determining that the third communication signal was transmitted by a third beacon of the plurality of beacons located within the predetermined detection zone;

inhibiting at least one function of the mobile device upon determining that the third communication signal was transmitted by the third beacon;

receiving, by a mobile device located within a fourth predetermined field of transmission, a fourth communication signal;

determining that the fourth communication signal was transmitted by the first beacon;

receiving, by a mobile device located within a fifth predetermined field of transmission, a fifth communication signal;

determining that the first communication signal was transmitted by the second beacon;

receiving, by a mobile device located within a sixth predetermined field of transmission, a sixth communication signal;

determining that the sixth communication signal was transmitted by the third beacon;

determining that the mobile device is in a location defined by an intersection of the fourth predetermined field of transmission, the fifth predetermined field of transmission, and the sixth predetermined field of transmission; and inhibiting the at least one function of the mobile device upon determining that the mobile device is in the location defined by the intersection of the fourth predetermined field of transmission, the fifth predetermined field of transmission, and the sixth predetermined field of transmission.

2. The method of claim 1, wherein the at least one function of the mobile device is a text messaging service function or a display screen function.

3. The method of claim 1, wherein the first predetermined field of transmission overlaps the second predetermined field of transmission.

4. The method of claim 1, wherein the second predetermined field of transmission overlaps the third predetermined field of transmission.

5. The method of claim 1, wherein the mobile device located within the first predetermined detection zone receiving the first communication signal comprises the mobile device located within the first predetermined detection zone continuously receiving the first communication signal, and the method further comprising permitting the at least one function of the mobile device following a predetermined time period after the mobile device no longer receives the first communication signal.

6. The method of claim 1, wherein the first predetermined field of transmission is adjustable according to a parameter of the first beacon.

7. A method for inhibiting a function of a mobile device in a predetermined detection zone, comprising:
  receiving, by a mobile device located within a first predetermined field of transmission, a first communication signal;
  determining that the first communication signal was transmitted by a first beacon of a plurality of beacons;
  inhibiting at least one function of the mobile device upon determining that the first communication signal was transmitted by the first beacon;
  receiving, by a mobile device located within a second predetermined field of transmission, a second communication signal;
  determining that the second communication signal was transmitted by a second beacon of the plurality of beacons located within the predetermined detection zone;
  inhibiting the at least one function of the mobile device upon determining that the second communication signal was transmitted by the second beacon;
  receiving, by a mobile device located within a third predetermined field of transmission, a third communication signal;
  determining that the third communication signal was transmitted by a third beacon;
  receiving, by the mobile device located within the predetermined detection zone, a fourth communication signal;
  determining that the fourth communication signal was transmitted by a fourth beacon;
  receiving, by the mobile device located within the predetermined detection zone, a fifth communication signal;
  determining that the fifth communication signal was transmitted by a fifth beacon;
  determining that the third communication signal, the fourth communication signal, and the fifth communication signal are received simultaneously by the mobile device; and
  inhibiting the at least one function of the mobile device upon determining that the third communication signal, the fourth communication signal, and the fifth communication signal are received within a predetermined period of time by the mobile device.

8. A system for inhibiting a function of a mobile device in a predetermined detection zone, the system comprising:
  a plurality of beacons comprising a first beacon and a second beacon; and
  wherein the first beacon is configured to transmit a first communication signal within a first predetermined field of transmission to a mobile device located within the first predetermined field of transmission of the first beacon and to cause the mobile device to inhibit at least one function of the mobile device based on the first communication signal transmitted by the first beacon; and
  wherein the second beacon is configured to transmit a second communication signal within a second predetermined field of transmission to the mobile device located within the second predetermined field of transmission of the second beacon and to cause the mobile device to inhibit at least one function of the mobile device based on the second communication signal transmitted by the second beacon;
  wherein the plurality of beacons comprises a third beacon;
  wherein the third beacon is configured to transmit a third communication signal within a third predetermined field of transmission to a mobile device located within the third predetermined field of transmission of the third beacon and is configured to cause the mobile device to inhibit at least one function of the mobile device based on the third communication signal transmitted by the third beacon;
  wherein the first beacon is configured to transmit a fourth communication signal within a fourth predetermined field of transmission;
  wherein the second beacon is configured to transmit a fifth communication signal within a fifth predetermined field of transmission;
  wherein the third beacon is configured to transmit a sixth communication signal within a sixth predetermined field of transmission; and
  wherein the first beacon, the second beacon, and the third beacon are configured to cause the mobile device to inhibit at least one function of the mobile device based on determining that the mobile device is in the location defined by the intersection of the fourth predetermined field of transmission, the fifth predetermined field of transmission, and the sixth predetermined field of transmission.

9. The system of claim 8, wherein each of the plurality of beacons is permanently attached to a walkway.

10. The system of claim 8, wherein the first predetermined field of transmission is adjustable according to a first parameter of the first beacon and wherein the second predetermined field of transmission is adjustable according to a second parameter of the second beacon.

11. A communications apparatus for inhibiting a function of a mobile device in a predetermined detection zone, the apparatus comprising:
  a mobile device; and
  a control module associated with the mobile device;
  wherein the control module is configured to receive a first communication signal transmitted by a first beacon of a plurality of beacons from a mobile device located within a first predetermined field of transmission of the first beacon;
  wherein the control module is configured to inhibit at least one function of the mobile device based on the first communication signal transmitted by the first beacon;
  wherein the control module is configured to inhibit a text messaging service function or display screen function of the mobile device;
  wherein the control module is configured to receive a second communication signal transmitted by a second beacon of the plurality of beacons for a mobile device located within a second predetermined field of transmission of the second beacon;
  wherein the control module is configured to inhibit at least one function of the mobile device based on the second communication signal transmitted by the second beacon;

wherein the control module is configured to receive a third communication signal transmitted by a third beacon from a mobile device located within a third predetermined zone of transmission of the third beacon;

wherein the control module is configured to inhibit at least one function of the mobile device based on the third communication signal transmitted by the third beacon;

wherein the control module is configured to receive a fourth communication signal transmitted by the first beacon for a mobile device located within a fourth predetermined zone of transmission of the first beacon;

wherein the control module is configured to receive a fifth communication signal transmitted by the second beacon for a mobile device located within a fifth predetermined zone of transmission of the second beacon;

wherein the control module is configured to receive a sixth communication signal transmitted by the third beacon for a mobile device located within a sixth predetermined zone of transmission of the third beacon; and wherein the control module is configured to inhibit the at least one function of the mobile device based on determining that the mobile device is in a location defined by the intersection of the fourth predetermined field of transmission, the fifth predetermined field of transmission, and the sixth predetermined field of transmission.

* * * * *